(12) United States Patent
Hinders et al.

(10) Patent No.: US 10,436,074 B2
(45) Date of Patent: Oct. 8, 2019

(54) COMBINED BRAYTON/RANKINE CYCLE GAS AND STEAM TURBINE GENERATING SYSTEM OPERATED IN TWO CLOSED LOOPS

(71) Applicant: Tascosa Advanced Service, Inc., Cypress, TX (US)

(72) Inventors: Edward Hinders, San Antonio, TX (US); Richard Wallace, San Antonio, TX (US); Susan Schoenung, Menlo Park, CA (US)

( * ) Notice: Subject to any disclaimer, the term of this patent is extended or adjusted under 35 U.S.C. 154(b) by 0 days.

(21) Appl. No.: 16/013,880

(22) Filed: Jun. 20, 2018

(65) Prior Publication Data

US 2019/0264582 A1     Aug. 29, 2019

Related U.S. Application Data

(63) Continuation-in-part of application No. 14/763,467, filed as application No. PCT/US2014/013073 on Jan. 24, 2014, now abandoned.
(Continued)

(51) Int. Cl.
| | |
|---|---|
| *F01K 23/10* | (2006.01) |
| *F02C 6/18* | (2006.01) |
| *F02C 3/34* | (2006.01) |
| *F01K 7/16* | (2006.01) |
| *F01K 3/20* | (2006.01) |

(Continued)

(52) U.S. Cl.
CPC ............... *F01K 23/10* (2013.01); *C25B 1/04* (2013.01); *C25B 9/06* (2013.01); *F01K 3/185* (2013.01); *F01K 3/20* (2013.01); *F01K 7/16* (2013.01); *F02B 43/10* (2013.01); *F02C 3/34* (2013.01); *F02C 6/18* (2013.01); *H02K 7/1823* (2013.01);
(Continued)

(58) Field of Classification Search
CPC ............ F05D 2220/72; F05D 2220/74; F05D 2220/76; C25B 1/04; C25B 9/06; F01K 3/185; F01K 3/20; F01K 7/16; F01K 23/10; F02B 43/10; F02C 3/34; F02C 6/18; H02K 7/1823
USPC ................................................. 290/1 R, 52
See application file for complete search history.

(56) References Cited

U.S. PATENT DOCUMENTS

| | | |
|---|---|---|
| 3,020,004 A | 2/1962 | Blyth et al. |
| 5,331,806 A | 7/1994 | Warkentin |

(Continued)

FOREIGN PATENT DOCUMENTS

DE         19808119         9/1999

*Primary Examiner* — Charles Reid, Jr.
(74) *Attorney, Agent, or Firm* — Shannon L Warren

(57) ABSTRACT

A combined cycle dual closed loop electric generating system, having a gas turbine assembly (having a combustion chamber, a compressor, a first pump, a first driveshaft, a gas turbine and a first generator) and a steam turbine assembly (having a second pump, a second driveshaft, a steam turbine and a second generator). The first portion of the working fluid circulates through the gas turbine assembly and a first heat exchanger. The second portion of the working fluid circulates through the steam turbine assembly and the first heat exchanger. The first heat exchanger transfers a first heat energy from the gas turbine loop to the steam turbine loop. The gas turbine assembly generates a first portion of an electric output. The steam turbine assembly generates a second portion of the electric output.

20 Claims, 8 Drawing Sheets

Related U.S. Application Data

(60) Provisional application No. 61/756,151, filed on Jan. 24, 2013.

(51) Int. Cl.
*F01K 3/18* (2006.01)
*H02K 7/18* (2006.01)
*C25B 1/04* (2006.01)
*C25B 9/06* (2006.01)
*F02B 43/10* (2006.01)

(52) U.S. Cl.
CPC ...... *F05D 2220/72* (2013.01); *F05D 2220/74* (2013.01); *F05D 2220/76* (2013.01)

(56) References Cited

U.S. PATENT DOCUMENTS

| | | | |
|---|---|---|---|
| 5,687,559 A | 11/1997 | Sato | |
| 6,910,335 B2 | 6/2005 | Viteri et al. | |
| 8,250,847 B2 | 8/2012 | Rapp et al. | |
| 2008/0190094 A1* | 8/2008 | Kauf | F01D 25/34 60/39.182 |
| 2009/0056341 A1* | 3/2009 | Sanchez | F01D 25/12 60/772 |
| 2010/0326084 A1 | 12/2010 | Anderson et al. | |
| 2012/0131950 A1* | 5/2012 | Kolscheid | F01K 13/02 62/613 |
| 2014/0116063 A1* | 5/2014 | Deng | F02C 3/24 60/780 |

\* cited by examiner

COMBINED BRAYTON/RANKINE CYCLE GAS AND STEAM TURBINE GENERATING SYSTEM OPERATED IN TWO CLOSED LOOPS

CROSS-REFERENCE TO RELATED APPLICATIONS

This application claims benefit to PCT application PCT/US2014/013073 (filed on 2014 Jan. 24) which, in turn, claims benefit to U.S. patent provisional application No. 61/756,151 (filed on 2013 Jan. 24). The PCT application earned a full allowability opinion in an International Search Report issued on May 21, 2014. Consequently, the PCT application was claimed by the immediate parent application to this one, U.S. patent application Ser. No. 14/763,467 filed on 2014 Jul. 24. Other foreign filings claiming benefit to the PCT application include granted Chinese patent CN104937222B, granted Japanese patent JP6308479B2, granted Australian patent 2014209146, pending EP2954175A4/A1, pending CA2896633A1, and pending KR20150107849A.

Currently pending US national stage application '467, although allowable in the opinion of the USPTO international search authority, encountered objections during prosecution.

Accordingly, this application has been amended to overcome the objections to '467 and further includes arguments in the background section which anticipate prior art arguments made by the examiner in '467.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

This disclosure relates generally to a combined Brayton/Rankine cycle gas and steam turbine generating system operated in two closed loops from enhanced ground water or hot geothermal fluids and which burns only hydrogen and oxygen instead of a fossil fuel with air in the gas turbine.

Conventional combined cycle gas turbine power plants operate on natural gas or other hydrocarbon-based or fossil fuels combusted with air to heat a working fluid, usually feed water, to produce steam for operating turbine generators to produce electricity that is fed to a distribution grid to supply customers with electricity. Such plants produce waste heat that must be dissipated, typically in cooling towers, radiators, heat sinks, condensate reservoirs, etc. Even when waste heat can be transferred to the working fluid in some way or delivered to other uses such as heating systems, such mitigating techniques are only partly helpful in reducing inefficiencies. Other known inefficiencies in generating electricity using turbines include the limitations of using air as an oxidizing agent, the losses in portions of the system required to dissipate heat transfer working fluid and combustion air within the system, etc.

Electric generating plants operating on fossil fuels are also known to be substantial emitters of compounds that cause air pollution, chiefly carbon dioxide ($CO_2$), silicon dioxide ($SO_2$), nitric oxide ($NO$), and other substances such as dioxins, mercury, fly ash and other particulates, etc. Further, the use of hydrocarbon-based fuels such as petroleum, coal, and synthetics including "synthesis gas" or the so-called bio-diesel require large-scale mining, processing, and transport facilities and operations that are known to require very large capital investment, substantial uses of other non-renewable resources, or even cause significant environmental harm.

Most conventional power plants operate in open loop cycles. For example water, heated by boilers fired by hydrocarbon fuels, provides steam to drive turbines, which in turn drive generators to produce electricity. The waste heat contained in the spent steam exhausted from the turbine, while it may be utilized in heating plants or fed to cooling towers or reservoirs to dissipate the heat, is not recirculated back to the input of the system.

A classic closed loop system is the Brayton Cycle, first described by George Brayton for an oil burning engine in 1870. Note that a closed loop system is characterized by a system in which energy may be exchanged with its surroundings (across the system boundary) but the mass in the system remains constant, i.e., it is not exchanged with its surroundings or permitted to cross the system boundary. In a Brayton cycle, most often implemented in systems using a turbine fed by compressed air that is heated in a combustion section and allowed to expand in the turbine to spin its output shaft and a generator connected to it. Exhaust air from the turbine is then fed back to the input of the compressor through a heat exchanger. While the net change in mass in the system is zero (in an ideal closed system) because the working fluid—air—is returned to the input, the energy returned to the input will be diminished by the amount of heat converted to electricity in the system and the amount of heat given up to the surroundings because of system losses.

A number of schemes to recover the lost heat in such systems have been devised. In one method, a regenerator is used to transfer heat from the exhaust side to the compressed air routed to said combustion section. An intercooler may be used with two compressors operated in series by cooling the gas output from the first compressor before it enters the second one. The cooling increases the density of the compressed air thereby enhancing the compression ratio. In a third technique called reheating, used with two turbines operated in series by heating the exhaust from the first turbine before it enters the second one. The reheating increases the expansion ratio of the gases and thus the rotational drive to the generator.

Regardless of these enhancements, and the potential for more efficient generation of electricity in a closed loop system, inefficiencies remain, which limit the utility of closed loop systems. Heat losses are still significant, and the additional devices added to the basic system add complexity and cost. Yet, the use of gas turbine engines to generate electricity, while not new, because of their widespread use in aircraft and ocean-going vessels, and some power plant applications, may offer substantial economies because of their ready availability, reliability, etc. There appears to be significant promise for an electric generating system if a way could be found to operate a gas turbine engine in a closed loop using renewable energy by overcoming the inefficiencies in existing systems.

In one known closed loop system, recently developed by Sandia National Laboratories, a Brayton cycle gas turbine replaces air—the usual working fluid of a gas turbine engine—with supercritical carbon dioxide (CO2) as a working fluid, which is said to be capable of boosting conversion efficiency of said gas turbine assembly 118 portion of a compact generating system from approximately 40% to perhaps 50%. The increased efficiency results from the greater density of the supercritical CO2—similar to that of a liquid—as compared with air, which is a gas having a much lower density. The supercritical CO2, because of its greater density and much higher temperatures can convey greater amounts of heat to a gas turbine to generate more electricity. The efficiency increase enables correspondingly smaller footprints for the generating facility. However, accompanying the greater temperatures is a greater risk of corrosion in the gas turbine's components because of the presence of dilute carbonic acid.

To recap, existing power plant designs suffer from several disadvantages including (a) operation on fossil fuels—hydrocarbon-based substances that are not only non-renewable, but also, when burned, emit numerous by products into the atmosphere, contributing to climate change, environmental pollution, and potential harmful health effects. Further, (b) existing designs that burn fossil fuels to produce heat have relatively low efficiency, which results in depletion of non-renewable resources at a faster rate than is prudent. In addition, (c) measures employed to mitigate the inherent inefficiencies tend to be complex, reducing reliability and increasing costs of manufacture, installation, and maintenance. Moreover, (d) operating a Brayton cycle plant on supercritical CO2 risks shortened life and/or damage from the corrosion that results from the extremely high temperatures with this working fluid.

Other known designs include U.S. Pat. Nos. 5,687,559 and 5,775,091 and DE application number DE19808119A1. However, the current disclosure presents efficiency gains (such thermodynamic efficiency gains) as over these fillings.

What is needed is a generating system that operates with reduced environmental impact and contributions to air pollution, can rely on renewable resources and less on non-renewable resources, generates electricity with substantially greater efficiency and long life, has a compact footprint, and can be placed in operation and operated at lower costs.

This design can reduce the response time available to dispatchers to tenths of a second for a up to 10 mw increase compared to 4-5 minutes for 10 mw. Down ramp is even slower for the other designs unless the operator and dispatcher decide to vent steam. In this design, the electrolyzers ramp up to full load subtracting excess power while preserving it—operating losses for future use. The gas turbine shuts off fuel and assumes connections to perform as a motor load. Steam is recovered through the waste heat recovery system.

The prior art designs require dumping 100% of fuel while engaged in ramping down. The design also provides for independent adjustment of grid frequency and reactive power output when operating in AC mode. Projections from the current system show equipment response when the signal is received is less that the time required by dispatching to send the signal. The plant also provides system inertia replacing old coal and uneconomic nuclear plants.

None of the known inventions and patents, taken either singularly or in combination, is seen to describe the instant disclosure as claimed. Accordingly, it would be advantageous to have an improved cascaded gas and steam turbine generating system operated in a closed loop from enhanced ground water or geothermal fluids and which burns only hydrogen and oxygen instead of a fossil fuel with air in said gas turbine assembly 118.

Prior art mentioned in the international search report and disclosed in the included ISR include: US 201210185144 A1 (DRAPER) 19 Jul. 2012 (19.07.2012) entire document; US 201210023956 A1 (POPOVIC) 2 Feb. 2012 (02.02.2012) entire document; U.S. Pat. No. 6,910,335 B2 (VITERI et al) 28 Jun. 2005 (28.06.2005) entire document; U.S. Pat. No. 8,250,847 B2 (RAPP et al) 28 Aug. 2012 (28.08.2012) entire document; and US 2010/0326084 A1 (ANDERSON et al) 30 Dec. 2010 (30.12.2010) entire document.

Additionally, due to the prosecution history of the parent application to this patent, we include this analysis of prior art reference Viteri U.S. Pat. No. 6,910,335 B2.

Combined Brayton/Rankine Cycle Gas and Steam Turbine Generating System Operated in Two Closed Loops, from now on is referred as P1

Semi-Closed Brayton Cycle Gas Turbine Power System, from now on is referred as P2.

The key difference between the two patents are as follows:

P1 operates in a complete closed loop cycles, whereas P2 describes about a semi closed loop cycle P1 consist of two cycles, a topping Braton cycle operating in closed loop and a bottoming Rankine Cycle operating in closed loop to enhance the efficiency of the system and reduce losses. P2 describes about a semi closed loop Bratton cycle with as the primary configuration and a possible additional configuration with a bottoming closed loop Rankine cycle.

P1 injects oxidizer and fuel in to the combustion chamber at desired operating pressure. P2 injects fuel in to the combustion chamber and oxidizer in to the compressor inlet.

P1 burns hydrogen and oxygen to generate steam. P2 burns hydrocarbon with oxidizer (air or oxygen) to generate steam, CO2, CO and other impurities depending on the fuel and oxidizer source.

Since P1 describes about a closed loop system and the working fluid is H2O in both cycles, no pollutants are released out of the system. P2 describes about a semi closed loop system with the working fluid as H2O, CO2 and other gases depending on the fuel and oxidizer used for the primary cycle and H2O for the bottoming cycle.

Since working fluid is a mixture of multiple gases in the primary cycle, they have to be separated (especially CO2 and other gases from the working fluid) and the polluting greenhouse gases like CO2 must be handled properly and stored.

P1 describes about a zero-pollution closed loop system, P2 describes about a semi closed system with reduced pollution when compared to a conventional system.

P1 generates hydrogen and oxygen by water electrolysis using renewable or excess electric power and stored in storage tanks. P2 derives oxygen from an air separation unit and used hydrocarbon fuels.

The Advantage and uniqueness of P1 over P2:

P1, operates in a closed loop cycle, which helps in eliminating the harmful polluting gases released into the environment. Making it more environmental friendly when compared to P2.

P1 propose to generate fuel and oxidizer using renewable power and excess electricity in the grid making it more reliable fuel source and enhances energy security, whereas P2 uses hydrocarbon fuels making it dependent on fossil fuels which are vulnerable to energy security.

P1 burns hydrogen and oxygen to generate steam which is allowed to pass through a gas turbine. P2 burns hydrocarbon and oxidizer to generate steam and other gases which is allowed to pass through gas turbine, potential problem being the possibility of forming corrosive gases when steam reacts with other gases in the combustion product which causes corrosion and erosion problems in the downstream equipment there by leading to premature failure of the system.

P2 requires an air separation unit, CO2 and other gas handling system that are extracted from the condenser, and they need to be compressed and stored in some safe facility to minimize the pollution from the system operation, thereby increasing the initial investment cost and operation cost and drop in efficiency as these processes requires energy.

Likewise, we address U.S. Pat. No. 5,331,806.

Combined Brayton/Rankine Cycle Gas and Steam Turbine Generating System Operated in Two Closed Loops, from now on is referred as P1

Hydrogen Fuelled Gas Turbine, from now on is referred as P3.

The key difference between the two patents are as follows:

P1 is a closed loop, combined cycle configuration, where as P3 is a closed loop Brayton cycle configuration.

P1 burns H2 and O2 and cools the flame with water and steam injection to desired temperature and allow it to pass through the gas turbine, since the gas turbine exit steam is hot, it is furthered allowed to pass through a heat exchanger where heat from the turbine exit's low pressure high temperature steam is used to convert high pressure water in to high pressure high temperature steam and used in bottoming Rankine cycle. There by enhancing the heat recovery rate and improving the overall efficiency of the cycle over the configuration as described in P3.

P3 burns hydrogen and O2 and dilutes the flame with steam to achieve desired temperature at combustion chamber outlet and then allow it to pass through the gas turbine, the hot gas turbine exit steam is redirected to the compressor inlet where it is compressed and reinjected into the combustion chamber. The key problem is high steam compression requires a lot of energy and compressor needs to be designed to handle high temperature steam as a typical compressor blades are designed to operate at approximately 450 C, whereas according to P3's description, the steam entering the gas compressor will likely to exceed that temperature.

P3 describes that water is injected in to the compressor to reduce the steam temperature during compression process, but in order to cool the steam substantial amount of water needs to be injected which leads to improper mass balance, oversized compressor and corrosion problems. P1 handles this issue by reducing the temperature of inlet steam in to the compressor and reducing the mass flow of steam into the compressor by optimizing the cooling steam and cooling water flow in the system.

If P3 tries to reduce their compressor steam inlet temperature, then a significant amount of water is needed to bring down the temperature in a condenser, which would increase the auxiliary water requirement (condenser cooling water) for the system.

BRIEF SUMMARY OF THE INVENTION

A system and a method are disclosed.

A combined cycle dual closed loop electric generating system, comprising a gas turbine assembly (comprising a combustion chamber, a compressor, a first pump, a first driveshaft, a gas turbine and a first generator) and a steam turbine assembly (comprising a second pump, a second driveshaft, a steam turbine and a second generator). Said first portion of said working fluid circulates through said gas turbine assembly and a first heat exchanger. Said second portion of said working fluid circulates through said steam turbine assembly and said first heat exchanger. Said first heat exchanger transfers a first heat energy from said gas turbine loop to said steam turbine loop. Said gas turbine assembly generates a first portion of an electric output. Said steam turbine assembly generates a second portion of said electric output.

A method of using a combined cycle dual closed loop electric generating system, comprising: generating a first portion of an electric output with a gas turbine assembly by burning a portion of a H2 and said O2; circulating a first portion of a working fluid through a gas turbine loop and a second portion of said working fluid through a steam turbine loop; heating said steam turbine loop with a first heat energy from said gas turbine loop with said first heat exchanger; conveying said second portion of said working fluid into said steam turbine assembly; and generating a second portion of said electric output with said steam turbine assembly. Said gas turbine assembly comprises a combustion chamber, a compressor, a first pump, a first driveshaft, a gas turbine and a first generator. Said steam turbine assembly comprising a second pump, a second driveshaft, a steam turbine and a second generator. Said gas turbine loop capable of holding and conveying a first portion of a working fluid. Said steam turbine loop capable of holding and conveying a second portion of said working fluid. Two closed loops comprising said gas turbine loop and said steam turbine loop. Said working fluid comprising a liquid and a vapor at different stages within said two closed loops. Said first portion of said working fluid circulates through said gas turbine assembly and a first heat exchanger. Said second portion of said working fluid circulates through said steam turbine assembly and said first heat exchanger. Said first heat exchanger transfers said first heat energy from said gas turbine loop to said steam turbine loop.

BRIEF DESCRIPTION OF THE SEVERAL VIEWS OF THE DRAWING

FIG. 3A illustrates a detailed block generating system diagram.

FIG. 3B illustrates a detailed block generating system diagram.

FIG. 4A illustrates a detailed view of said electric input.

FIG. 4B illustrates a detailed view of said gas turbine assembly.

FIG. 4C illustrates a detailed view of said steam turbine assembly.

FIG. 4D illustrates a detailed view of said electric output.

FIG. 5A illustrates said market load chart with a market load forecast and an actual market load.

FIG. 5B illustrates said market load chart with only said actual market load.

FIG. 5C illustrates said market load chart with said market load forecast.

DETAILED DESCRIPTION OF THE INVENTION

Described herein is a combined Brayton/Rankine cycle gas and steam turbine generating system operated in two closed loops from enhanced ground water or hot geothermal fluids and which burns only hydrogen and oxygen instead of a fossil fuel with air in said gas turbine assembly 118. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

The Figures depict the principle features of the disclosure, reference numbers that refer to the structural features forming the operative combination. Inputs and outputs of conductors for signals, fluids, and the like are indicated as follows: an input is indicated by an arrowhead pointing to a symbol for a component and an output is indicated by a line in contact with the symbol for a component and extending to a circle at the opposite end of the line. Examples of the principle components are illustrative for an exemplary, modest scale power plant of the 1 to 35 MegaWatt capacity. Appropriately scaled components are available for other power generation outputs. Unless otherwise designated, 2 pt. lines between components represent conduits with the corresponding inputs and outputs. Note that a person of ordinary skill in the art would be capable of selecting sufficiently adequate conduit for the connections between the components. Further, dashed lines are used to indicate electricity transmission lines with arrowheads used to indicate a direction of power flows.

Figure 1:
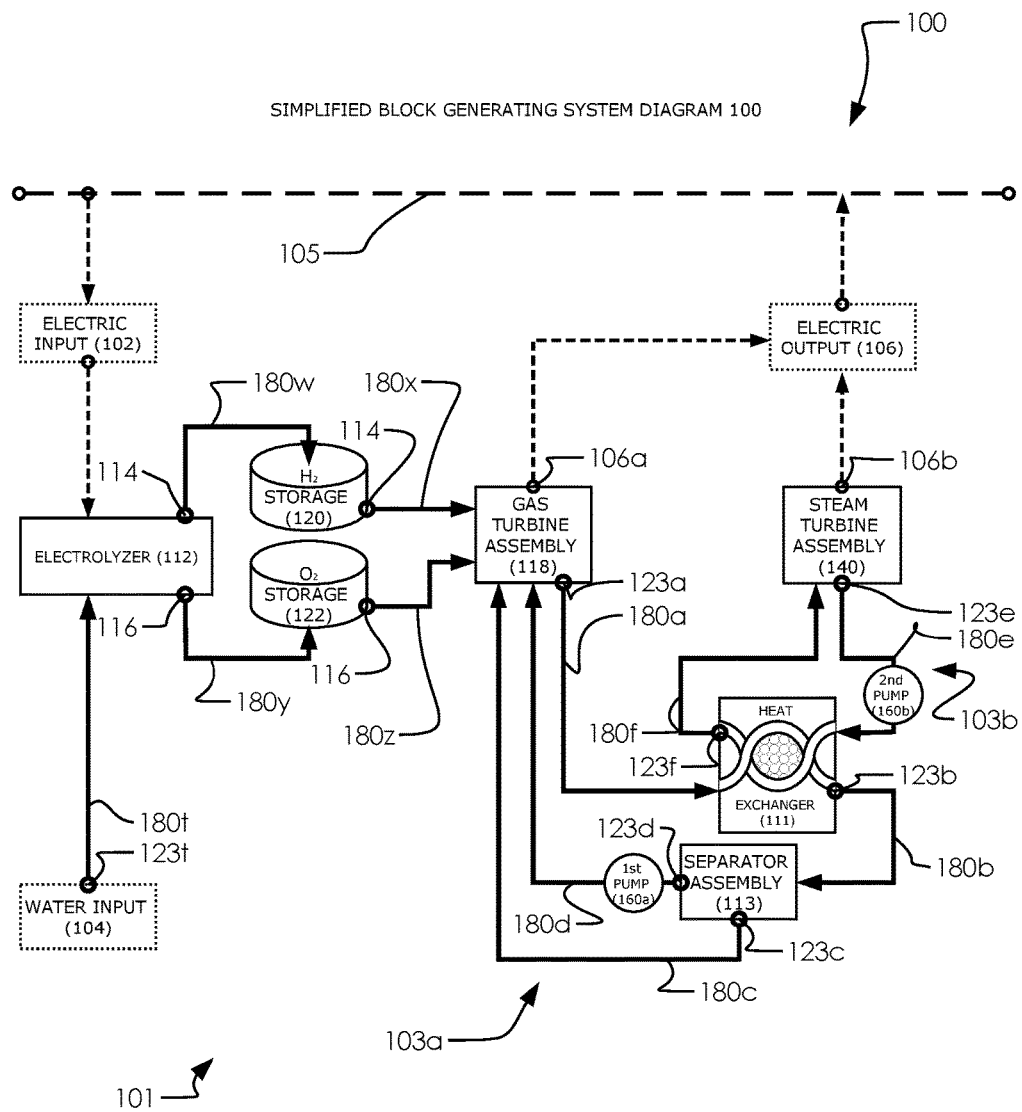
FIG. 1 illustrates a simplified block generating system diagram of a dual closed loop electric generating system.

FIG. 1 illustrates a simplified block generating system diagram 100 of a dual closed loop electric generating system 101.

Note that simplified block generating system diagram 100 represents a minimalistic version of said dual closed loop electric generating system 101, many of the elements illustrated in FIG. 1 are described and illustrated in more detail below.

In one embodiment, said dual closed loop electric generating system 101 can comprise an electric input 102, a gas turbine loop 103a, a steam turbine loop 103b, a water input 104, an electric output 106, a heat exchanger 111, an electrolyzer 112, a separator assembly 113, a gas turbine assembly 118, an H2 storage tank 120, an O2 storage tank 122, a steam turbine assembly 140, a plurality of conduits, a working fluids, a second pump 160b and a first pump 160a.

In one embodiment, said gas turbine loop 103a and said steam turbine loop 103b can each comprise a closed loop system which convey said working fluids (which can be supplied by said water input 104) through said gas turbine assembly 118 and said steam turbine assembly 140 without comingling said working fluid between one another.

In one embodiment, said gas turbine loop 103a and said steam turbine loop 103b can be referred to together as a two closed loops. In one embodiment, said gas turbine loop 103a can comprise a first portion of said working fluid and said steam turbine loop 103b can comprise a second portion of said working fluid. In one embodiment, said first and second portions of said working fluid can be run into a water polisher and rust inhibitor.

In one embodiment, the elements found in said dual closed loop electric generating system 101 can be connected by said plurality of conduits which are labeled with the label number "180" followed by a letter. For example, said plurality of conduits can comprise a first gas turbine loop conduit 180a, a second gas turbine loop conduit 180b, a third gas turbine loop conduit 180c, a fourth gas turbine loop conduit 180d, a first steam turbine loop conduit 180e, a second steam turbine loop conduit 180f, a first working conduit 180g, an fifth gas turbine loop conduit 180h, a second working conduit 180k, a third working conduit 180m, a fourth working conduit 180n a fifth working conduit 180p, a sixth working conduit 180q, a seventh working conduit 180r, an eighth working conduit 180t, a sixteenth conduit 180w, a seventeenth conduit 180x, an eighteenth conduit 180y, and a nineteenth conduit 180z.

Said plurality of working fluids in said dual closed loop electric generating system 101 are labeled with the label number "123" followed by a letter. For example, said plurality of conduits can comprise a first gas turbine loop fluid 123a, a second gas turbine loop fluid 123b, a third gas turbine loop fluid 123c, a fourth gas turbine loop fluid 123d, a first steam turbine loop fluid 123e, a second steam turbine loop fluid 123f, a first working fluid 123g, a fifth gas turbine loop fluid 123h, a second working fluid 123k, a third working fluid 123m, a fourth working fluid 123n a fifth working fluid 123p, a sixth working fluid 123q, a seventh working fluid 123r, and an eighth working fluid 123t.

In one embodiment, said gas turbine loop 103a can comprise: said first gas turbine loop conduit 180a carrying said first gas turbine loop fluid 123a (which can substantially comprise a vapor) from said gas turbine assembly 118 to said heat exchanger 111; said second gas turbine loop conduit 180b carrying said second gas turbine loop fluid 123b (which can substantially comprise a vapor and a liquid) from said heat exchanger 111 to said separator assembly 113; said separator assembly 113 separating said second gas turbine loop fluid 123b into said third gas turbine loop fluid 123c (substantially comprising a vapor portion) and said fourth gas turbine loop fluid 123d (substantially comprising a liquid portion); said fourth gas turbine loop conduit 180d carrying said fourth gas turbine loop fluid 123d from said separator assembly 113, through said first pump 160a and to said gas turbine assembly 118; and said first steam turbine loop conduit 180d carrying said first steam turbine loop fluid 123e from said separator assembly 113 to said gas turbine assembly 118. In one embodiment, said first pump 160a can regulate a flow rate of said fourth gas turbine loop fluid 123d between gas turbine assembly 118 and said separator assembly 113.

Likewise, in one embodiment, said steam turbine loop 103b can comprise: said first steam turbine loop conduit 180e carrying said first steam turbine loop fluid 123e from said steam turbine assembly 140 to said heat exchanger 111, said second steam turbine loop conduit 180f carrying said second steam turbine loop fluid 123f from said heat exchanger 111 to said steam turbine assembly 140, and said second pump 160b regulating a flow rate of said first steam turbine loop fluid 123e.

In one embodiment, said electrolyzer 112 can receive said electric input 102 and said water input 104 and generate an H2 114 and an O2 116, which can be stored in said H2 storage tank 120 and said O2 storage tank 122, respectively. In one embodiment, said conduit 180t can carry said eighth working fluid 123t of said water input 104 to said electrolyzer 112. In one embodiment, said sixteenth conduit 180w can carry said H2 114 from said electrolyzer 112 to said H2 storage tank 120 and an eighteenth conduit 180y can carry said H2 114 from said H2 storage tank 120 to said gas turbine assembly 118. Likewise, in one embodiment, said eighteenth conduit 180y can carry said O2 116 from said electrolyzer 112 to said O2 storage tank 122 and said nineteenth conduit 180z can carry said O2 116 to said gas turbine assembly 118 from said electrolyzer 112. In one embodiment, said dual closed loop electric generating system 101 can bypass said H2 storage tank 120 and/or said O2 storage tank 122 where storage of said H2 114 and/or said O2 116 is unnecessary.

In one embodiment, said gas turbine assembly 118 can burn a portion of said H2 114 and said O2 116 and generate a first portion 106a of said electric output 106. In one embodiment, said gas turbine assembly 118 can heat said fourth gas turbine loop fluid 123d and said third gas turbine loop fluid 123c while generating said first portion 106a of said electric output 106. Alternatively, in one embodiment, said third gas turbine loop fluid 123c and said fourth gas turbine loop fluid 123d can enter said gas turbine assembly 118 cooler than when it exits said gas turbine assembly 118 in the form of said first gas turbine loop fluid 123a.

In one embodiment, said dual closed loop electric generating system 101 can receive and deliver power to a distribution grid 105. In one embodiment, said distribution grid 105 can comprise power generating equipment such as wind and solar arrays, traditional power generation, and/or similar as would be known to one in the art.

In one embodiment, said heat exchanger 111 can cool said second gas turbine loop fluid 123b. Thus, in one embodiment said second gas turbine loop fluid 123b can be cooler than said first gas turbine loop fluid 123a. Accordingly, said heat exchanger 111 can serve to transfer heat from said gas turbine loop 103a to said steam turbine loop 103b.

In one embodiment, said second steam turbine loop fluid 123f can enter said steam turbine assembly 140 hotter than when it exits as said first steam turbine loop fluid 123e. Likewise, in one embodiment, said heat exchanger 111 can be used to reheat said steam turbine loop 103b, as discussed above. Alternatively, in one embodiment, said heat exchanger 111 can serve to transfer heat energy from gas turbine loop 103a and into said steam turbine loop 103b. In one embodiment, said steam turbine assembly 140 can generate a second portion 106b using said first heat energy.

In one embodiment, said gas turbine assembly 118 and said steam turbine assembly 140 drive a plurality of generators (comprising of said first generator 119 and said second generator 142) to produce electric power; wherein, in a preferred embodiment, this production is accomplished without carbon-based emissions.

In one embodiment, said dual closed loop electric generating system 101 can operate in the absence of said electrolyzer 112 where said H2 114 and said O2 116 are supplied by another source. For example, in one embodiment, said H2 114 can be supplied by a refinery or a factory and said O2 116 can be provided by means unrelated to said electrolyzer 112.

Figure 2A:
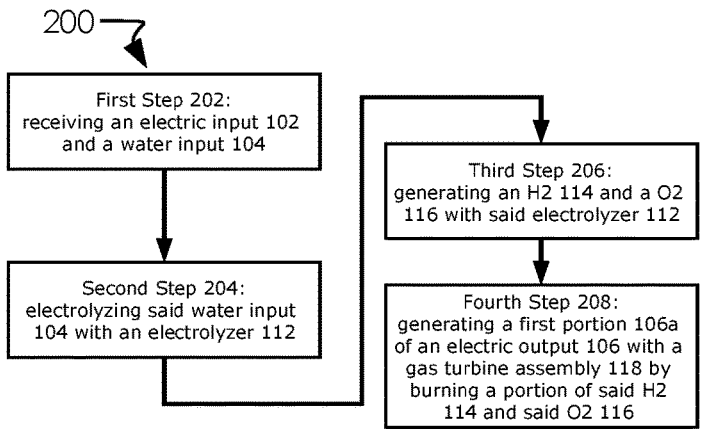
FIGS. 2A and 2B illustrate a first method and a second method of using said dual closed loop electric generating system, respectively.
Figure 2B:
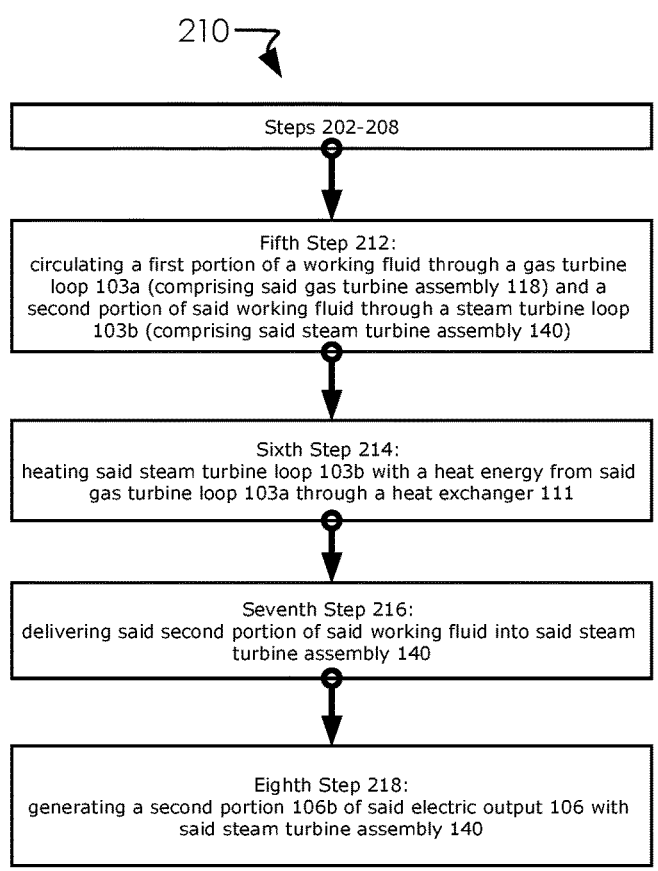

FIGS. 2A and 2B illustrate a first method 200 and a second method 210 of using said dual closed loop electric generating system 101, respectively.

Regarding FIG. 2A, in one embodiment, said first method 200 of using said dual closed loop electric generating system 101 can comprise: a first step 202 of receiving said electric input 102 and said water input 104; a second step 204 of electrolyzing said water input 104 with said electrolyzer 112; a third step 206 of generating an H2 114 and an O2 116 with said electrolyzer 112; and a fourth step 208 of generating said first portion 106a of said electric output 106 with said gas turbine assembly 118 by burning a portion of said H2 114 and said O2 116.

Regarding FIG. 2B, in one embodiment, said second method 210 of using said dual closed loop electric generating system 101 can comprise the steps of said first method 200 and further comprising: a fifth step 212 of circulating a first portion of said working fluid through said gas turbine loop 103a and a second portion of said working fluid through said steam turbine loop 103b; a sixth step 214 of heating said steam turbine loop 103b with said first heat energy from said gas turbine loop 103a through said heat exchanger 111; a seventh step 216 of delivering said second portion of said working fluid into said steam turbine assembly 140; and an eighth step 218 of generating a second portion 106b of said electric output 106 with said steam turbine assembly 140.

In one embodiment, said first portion of said working fluid can comprise said first gas turbine loop fluid 123a, said second gas turbine loop fluid 123b, said third gas turbine loop fluid 123c and said fourth gas turbine loop fluid 123d. In one embodiment, said second portion of said working fluid can comprise said first steam turbine loop fluid 123e and said second steam turbine loop fluid 123f.

Figure 3A:
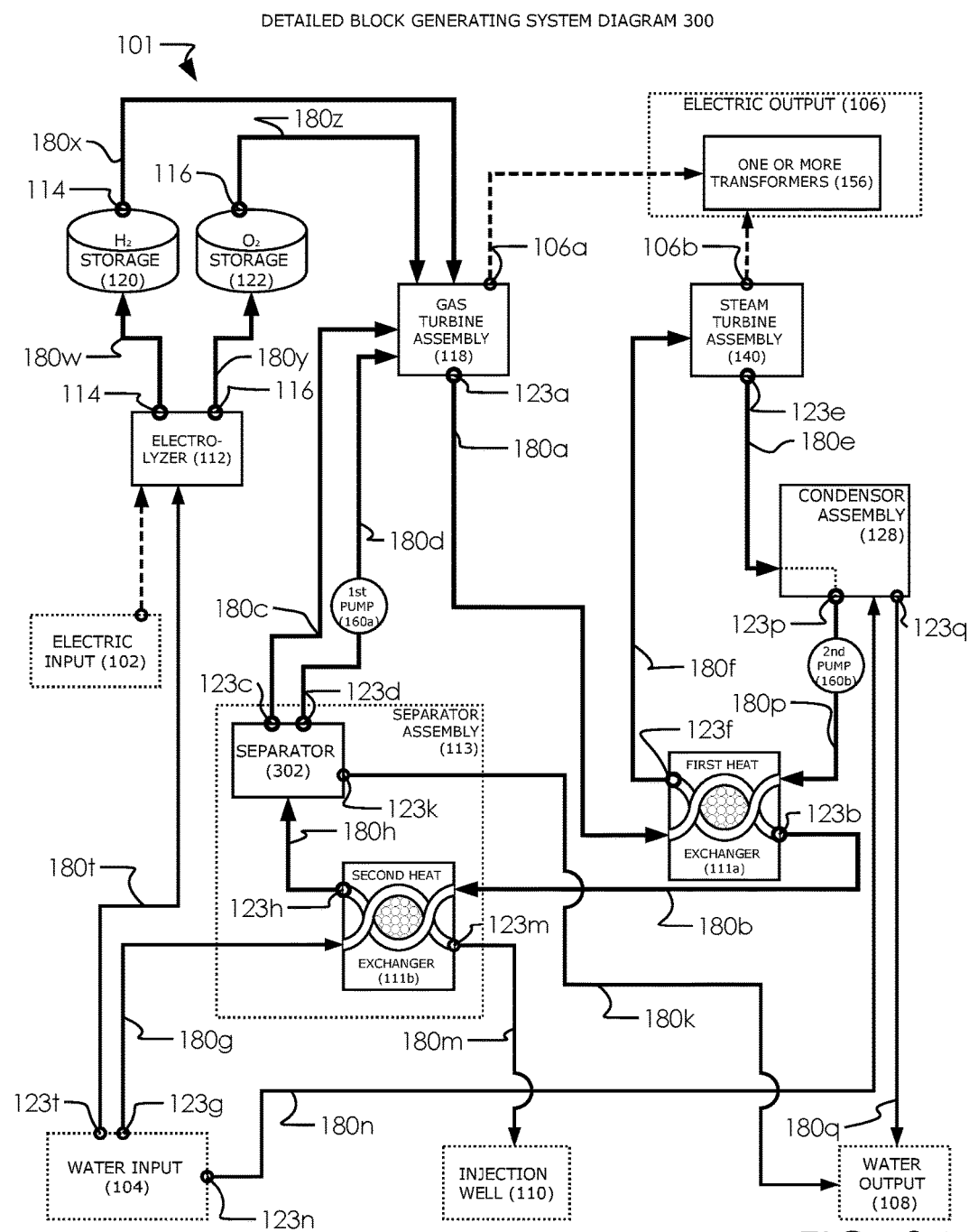
FIGS. 3A and 3B illustrate two detailed embodiments of said dual closed loop electric generating system.
Figure 3B:
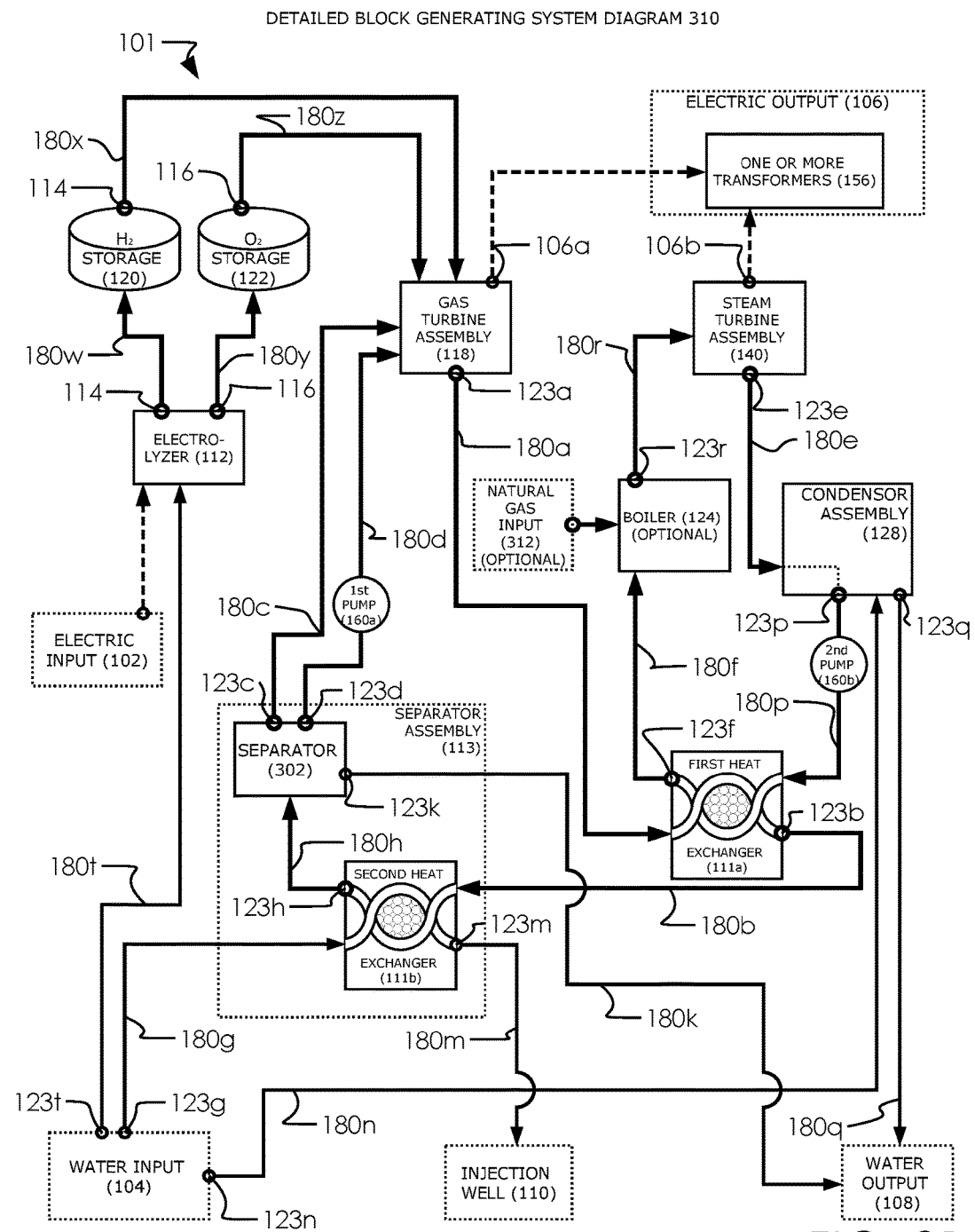

FIGS. 3A and 3B illustrate two detailed embodiments of said dual closed loop electric generating system 101.

By way of comparison, FIGS. 3A and 3B have additional detail as opposed to FIG. 1. For example, in one embodiment, said heat exchanger 111 of said simplified block generating system diagram 100 is broken into a first heat exchanger 111a and a second heat exchanger 111b. Additional elements have been added such as a boiler 124 (FIG. 3B), a condenser assembly 128, and a separator 302.

FIG. 3A illustrates a detailed block generating system diagram 300. Said detailed block generating system diagram 300 comprises a preferred embodiment of said dual closed loop electric generating system 101.

In one embodiment, said gas turbine assembly 118 can receive said H2 114 through said seventeenth conduit 180x, said O2 116 through said nineteenth conduit 180z, said third gas turbine loop fluid 123c through said third gas turbine loop conduit 180c and said fourth gas turbine loop fluid 123d through said fourth gas turbine loop conduit 180d. In turn, said gas turbine assembly 118 can generate said first portion 106a by burning a portion of said H2 114 and said O2 116, as is known in the art. In one embodiment, said first portion 106a can be passed from said dual closed loop electric generating system 101 to said distribution grid 105 through a one or more transformers 156.

Turning now to said gas turbine loop 103a, in one embodiment, said separator assembly 113 can comprise said second heat exchanger 111b and said separator 302. In one embodiment, said separator assembly 113 can receive said second gas turbine loop fluid 123b (through said second gas turbine loop conduit 180b) and a first working fluid 123g (through a first working conduit 180g). In one embodiment, said separator assembly 113 can comprise said second heat exchanger 111b and said separator 302. In one embodiment, said separator assembly 113 can separate a liquid stream (said fourth gas turbine loop fluid 123d) and a vapor stream (said third gas turbine loop fluid 123c) from said second gas turbine loop fluid 123b by: cooling said second gas turbine loop fluid 123b into said fifth gas turbine loop fluid 123h with said second heat exchanger 111b; delivering said fifth gas turbine loop fluid 123h to said separator 302 in an fifth gas turbine loop conduit 180h; separating said third gas turbine loop fluid 123c from said fourth gas turbine loop fluid 123d with said separator 302; and discharging a second working fluid 123k from said separator 302 to said water output 108 through a second working conduit 180k. In one embodiment, said second heat exchanger 111b cools said second gas turbine loop fluid 123b by: receiving said first working fluid 123g from said water input 104; transferring a first heat energy from said second gas turbine loop fluid 123b into said first working fluid 123g; and discharging a third working fluid 123m from said second heat exchanger 111b and into said injection well 110 through a third working conduit 180m. In one embodiment, a volume of fluid discharged from said dual closed loop electric generating system 101 at said second working fluid 123k can substantially equal to a volume of fluid received into said dual closed loop electric generating system 101 at said electrolyzer 112. Albeit not simultaneously, this conservation of matter is the effect of said H2 114 and said O2 116 recombining into H2O.

Turning now to said steam turbine loop 103b, in one embodiment, said first steam turbine loop fluid 123e can be cooled with said condenser assembly 128 between said steam turbine assembly 140 and said first heat exchanger 111a. In one embodiment, said condenser assembly 128 can receive said first steam turbine loop fluid 123e (through said first steam turbine loop conduit 180e), and a fourth working fluid 123n from said water input 104 through a fourth working conduit 180n. In one embodiment, said fourth working fluid 123n can comprise water. In one embodiment, said condenser assembly 128 can receive said first steam turbine loop fluid 123e and discharge the same as a fifth working fluid 123p through a fifth working conduit 180p to said first heat exchanger 111a. In one embodiment, said condenser assembly 128 can discharge a sixth working fluid 123q through a sixth working conduit 180q. In one embodiment, said first heat exchanger 111a can heath said fifth working fluid 123p in the manner described above when describing said heat exchanger 111; namely, said first heat exchanger 111a can heat said steam turbine loop 103b with said first heat energy from said gas turbine loop 103a.

The heat exchanger 111 may preferably be a custom fabricated, fully cross-flow unit designed for maximum heat transfer with minimum external losses. In one embodiment interleaved demand side and source side passages are respectively defined and implemented for conducting the gas turbine exhaust and steam turbine working fluid respectively. Similarly, the separator may preferably be a custom design adapted to efficiently separating liquid and vapor phase substances from the turbine exhaust stream. The boiler may be a standard type. The generators may be supplied by such manufacturers as Skinner Power Systems® of Erie, Pa. or Asea Brown Bovieri (ABB®) of Zurich, Switzerland. The transformers may be available from Allis-Chalmers Energy® of Houston, Tex., or Siemens Corporation®.

FIG. 3B illustrates a detailed block generating system diagram 310. In one embodiment, said detailed block generating system diagram 310 can comprise an embodiment of said dual closed loop electric generating system 101 further comprising a boiler 124 which can heat said second steam turbine loop fluid 123f prior to entry into said steam turbine assembly 140. For example, in one embodiment, said boiler 124 can receive a natural gas input 312 which can heat said second steam turbine loop fluid 123f and deliver a seventh working fluid 123r in a seventh working conduit 180r to said steam turbine assembly 140. In one embodiment, said boiler 124 can be optional to said dual closed loop electric generating system 101. In one embodiment, said natural gas input 312 can comprise an excess natural gas which may otherwise be flared; wherein, said dual closed loop electric generating system 101 can receive a flare gas and convert it into said electric output 106, which can in turn, be turned to fill said H2 storage tank 120 and/or said O2 storage tank 122 for later use.

As discussed, in one embodiment, said boiler 124 can be fueled by said natural gas input 312. In one embodiment, said natural gas input 312 can comprise methane (CH4) separated from said water input 104 (the geothermal fluid) or from some other source, which may be conveyed through a separate conduit (not shown). It will be appreciated that the geothermal and working fluids, the hydrogen and oxygen gases, the steam in various states, and the electricity are not part of the structure of the system but rather the operative subject matter processed by the system to produce electricity.

In one embodiment, the basic source of first heat energy for operation of the dual closed loop electric generating system 101 may be a geothermal fluid or a ground water obtained from a deposit accessed via well a well, as is known in the art, below the Earth's surface. The ground water or geothermal fluid—chiefly brine, which may contain a variety of fluids bearing minerals or hydrocarbons in liquid form—enters the system via said water input 104. In one embodiment, said geothermal fluid is conveyed through said dual closed loop electric generating system 101 (as discussed) followed by the exit of the cooled geothermal fluid through said third working conduit 180m and said sixth working conduit 180q, at said injection well 110 and said water output 108 respectively. In one embodiment, said water output 108 can comprise an injection well or a municipal use as discussed below. Alternatively, the cooled geothermal fluid may be stored for later processing or shipment (not illustrated).

The geothermal fluid, following separation of certain corrosive or unneeded substances, typically in gaseous or vapor form, from the raw material obtained from the subsurface deposits, may be conveyed vian eighth working conduit 180t to said electrolyzer 112 for processing to produce said H2 114 and said O2 116.

FIGS. 4A, 4B, 4C and 4D illustrate detailed portions of said simplified block generating system diagram 100.

Figure 4A:
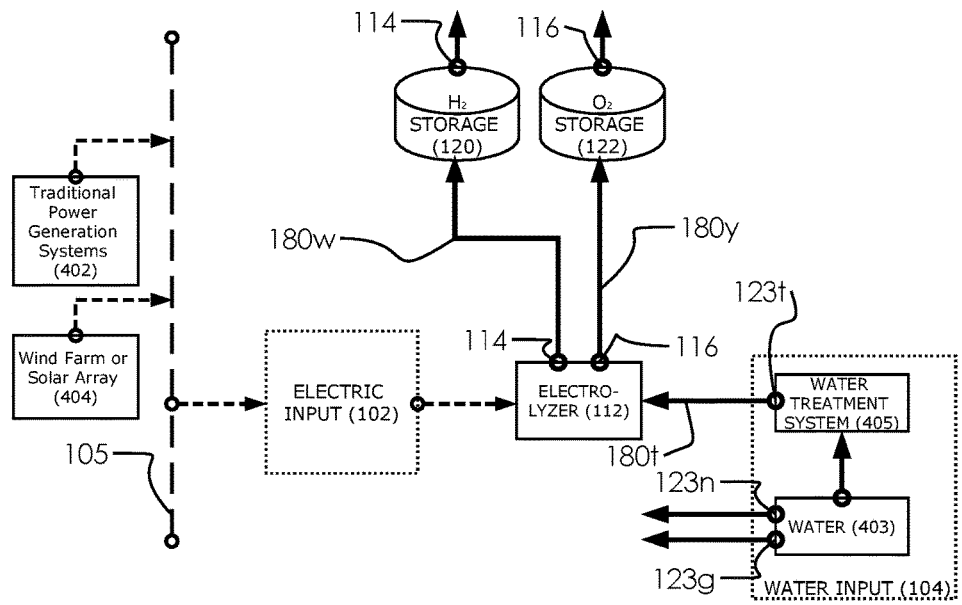
FIGS. 4A, 4B, 4C and 4D illustrate detailed portions of said simplified block generating system diagram.

FIG. 4A illustrates a detailed view of said electric input 102. In one embodiment, said electric input 102 can comprise an electrical input from said distribution grid 105, which can acquire power from a traditional power generation system 402 or a wind or solar array 404. Electricity for operation of said electrolyzer 112 may be supplied by said distribution grid 105 or renewable sources (such as wind or solar array 404).

In one embodiment, said electrolyzer 112 can comprise a self-contained electrolyzer for separating said H2 114 and said O2 116 from said water input 104 (substantially comprising H2O). Thereafter, said H2 114 and said O2 116 can be burned by said gas turbine assembly 118 to produce supercritical steam at higher pressures and temperatures that directly or indirectly drive said steam turbine assembly 140 at enhanced efficiency.

In one embodiment, said electrolyzer 112 can comprise an ITM Power Electrolyzer, which may produce hydrogen and oxygen at pressure. In one embodiment, said electrolyzer 112 can comprise a 15 kW unit manufactured by Giner Electrochemical Systems, LLC, of Newton, Mass., a lightweight electrolyzer stack for use in light weight, high altitude aircraft.

In one embodiment, said electrolyzer 112 can require a source of mineralized water. In one embodiment, said water input 104 can comprise a water 403 in fluid connection with a water treatment system 405. In one embodiment, said water 403 can comprise a geothermal fluid as is known in the art. In one embodiment, said water treatment system 405 can remove chemicals and hydrocarbons from said water 403 leaving water and ordinary minerals necessary for a proper operation of said electrolyzer 112. In one embodiment, said water 403 need not be filtered and treated by said water treatment system 405 for use as said fourth working fluid 123n and said first working fluid 123g. In one embodiment, said water 403 can comprise a ground water or a municipal water source.

Said electrolyzer 112 can be operated from electricity drawn from said distribution grid 105, which can comprise of renewable sources (such as said wind or solar array 404), from fuel cells, or from either or both of said gas turbine assembly 118 and said steam turbine assembly 140. The outputs from said electrolyzer 112 include substantially pure oxygen (O2 116) and hydrogen (H2 114), which are conveyed to respective storage tanks via respective conduits. In one embodiment, said electrolyzer 112 can comprise a cathode (not illustrated) and an anode (not illustrated), as is known in the art. In one embodiment, said eighteenth conduit 180y is coupled to said cathode within said electrolyzer 112, which supplies said O2 116. Similarly, in one embodiment, said sixteenth conduit 180w can be coupled to said anode within said electrolyzer 112, which supplies said H2 114. In one embodiment, during operation of said dual closed loop electric generating system 101, said H2 114 and said O2 116 are conveyed to the respective input ports of a combustion chamber 408 (illustrated and discussed below) within said gas turbine assembly 118.

Figure 4B:
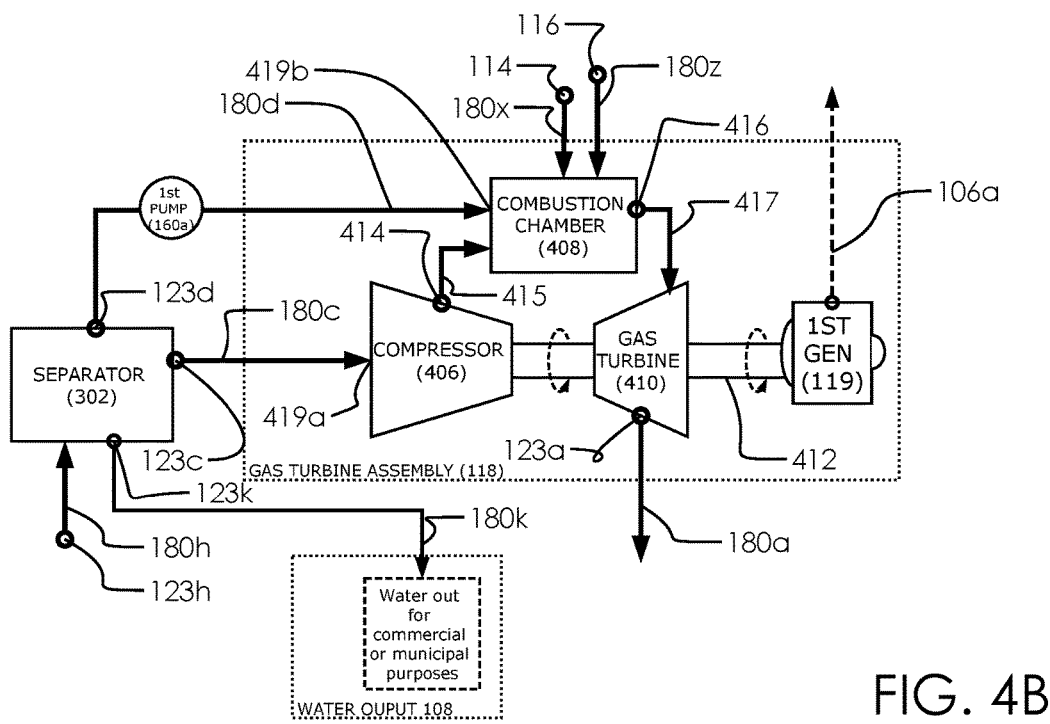

FIG. 4B illustrates a detailed view of said gas turbine assembly 118. In one embodiment, said gas turbine assembly 118 can comprise a first generator 119, a compressor 406, said combustion chamber 408, a gas turbine 410 and a first second driveshaft 412. In one embodiment, said compressor 406 receives said third gas turbine loop fluid 123c (which can comprise a vapor) through said third gas turbine loop conduit 180c. In one embodiment, said compressor 406 can compress said third gas turbine loop fluid 123c and work in conjunction with said gas turbine 410. In one embodiment, said compressor 406 can produce a working fluid 414 and deliver said working fluid 414 to said combustion chamber 408 through a twentieth conduit 415. In one embodiment, said combustion chamber 408 can receive: said H2 114 through said seventeenth conduit 180x; said O2 116 through said nineteenth conduit 180z; said working fluid 414 through said twentieth conduit 415; and said fourth gas turbine loop fluid 123d through said fourth gas turbine loop conduit 180d. In one embodiment, said combustion chamber 408 can produce a twenty-first gas turbine loop fluid 416 which can be delivered to said gas turbine 410 through a twenty-first gas turbine loop conduit 417. In one embodiment, said gas turbine 410 can use said twenty-first gas turbine loop fluid 416 a fuel to drive said first second driveshaft 412. In one embodiment, said gas turbine 410 can comprise an exhaust which can comprise said first gas turbine loop fluid 123a.

In one embodiment, said first second driveshaft 412 can be rotateably attached to said first generator 119; wherein, said gas turbine 410 can drive said first second driveshaft 412 and said first generator 119 can generate said first portion 106a, as is known in the art.

In one embodiment, said separator 302 can regulate a the proportions of vapor admitted into an air inlet 419a of said compressor 406 via said third gas turbine loop conduit 180c and the proportion of liquid admitted into said combustion chamber 408 (at a water injection port 419b) through said fourth gas turbine loop conduit 180d. In one embodiment, said water injection port 419b can be located in the aft-most portion of said combustion chamber 408. In one embodiment, said separator 302 can divide said vapor into said third gas turbine loop fluid 123c and said liquid into said fourth gas turbine loop fluid 123d, as discussed above. In one preferred operating embodiment, said third gas turbine loop fluid 123c can comprise approximately 25% of said first working fluid 123g and said fourth gas turbine loop fluid 123d can comprise the balance of said first working fluid 123g.

In one embodiment, said third gas turbine loop fluid 123c (comprising a vapor) which can be used by said compressor 406 can be limited by the flow volume rate of the air inlet 419a at said compressor 406 (i.e., the stall limit of said compressor 406). This limitation is necessary to prevent stalling of the engine. The balance of the said third gas turbine loop fluid 123c can be fed to said combustion chamber 408 at said water injection port 419b, which can be near the output of said combustion chamber 408. In one embodiment, this is conveniently accomplished when a type T56-A gas turbine engine (manufactured by Rolls-Royce®) is used because it is equipped with a water injection port (not shown figures) just aft of the "burn can" in said compressor 406. There, the working fluid (which can comprise a portion of said water input 104) is mixed with said H2 114 and said O2 116 and reheated to drive said gas turbine 410. In one embodiment, the working fluid fed to said water injection port 419b, which increases the volume of steam and also cools the steam to a temperature that meets a one or more metallurgical specifications of the components in said steam turbine assembly 140. In one embodiment, said working fluid and a combustion product are mixed in the exhaust section of said gas turbine assembly 118 at said first gas turbine loop fluid 123a.

In one embodiment, the combustible materials (that is, the inputs of said combustion chamber 408) for the system include pure hydrogen H2 and pure oxygen O2 produced by said electrolyzer. The incoming low pressure/low temperature working fluid at water injection port 419b from said separator 302 undergoes a compression on the order of 12:1 to 16:1 in said combustion chamber 408, and the compressed working fluid is mixed in said combustion chamber 408 with said H2 114 and said O2 116, preferably mixed in a ratio of 2 kg of said H2 114 to 8 kg of said O2 116, as measured in a flow meter (not shown) and checked by steam analysis (not shown), to produce supercritical steam for driving said gas turbine 410. In one embodiment, said H2 114 and said O2

116 gases are used as fuel instead of a fossil fuel or other carbon-based fuel mixed with atmospheric air for two reasons: (a) to increase the temperature of the steam to supercritical levels; and (b) to eliminate the release of carbon dioxide (CO2) into the atmosphere. As is well known, the combination of carbon-based fuels (e.g., coal, fuel oil, natural gas, etc.) and air, while they provide said combustion fuels used in conventional power plants, suffer from the inefficiencies of low temperatures and harmful environmental effects of emissions to the atmosphere and corrosion of components of said dual closed loop electric generating system 101.

Examples of said gas turbine 410, for use in said dual closed loop electric generating system 101, include a type T56-A series gas turbine manufactured by Rolls-Royce®; and a type SST-200 steam turbine manufactured by the Siemens Corporation® of Germany.

Figure 4C:
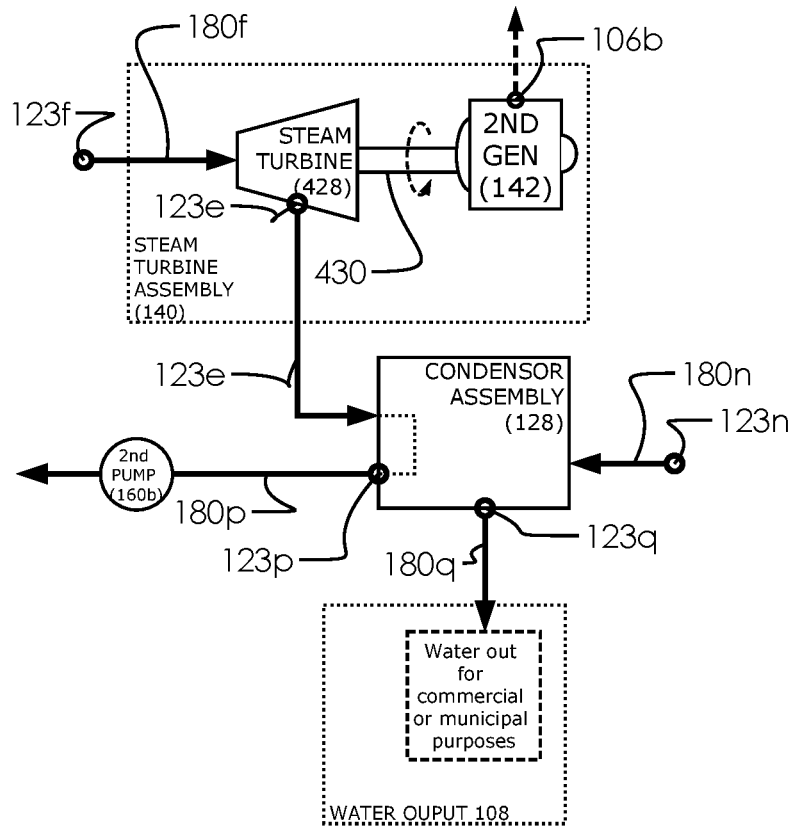

FIG. 4C illustrates a detailed view of said steam turbine assembly 140. In one embodiment, said steam turbine assembly 140 can comprise a steam turbine 428, a second driveshaft 430, and a second generator 142. In one embodiment, said steam turbine 428 can receive said second steam turbine loop fluid 123f (comprising a vapor); wherein, said steam turbine 428 can drive said second driveshaft 430 with energy received from said second steam turbine loop fluid 123f; further wherein, said second driveshaft 430 can drive said second generator 142 which can, in turn, generate said second portion 106b of said electric output 106.

In one embodiment, said steam turbine assembly 140 can receive said second steam turbine loop fluid 123f through said second steam turbine loop conduit 180f and discharge said first steam turbine loop fluid 123e into said first steam turbine loop conduit 180e. In one embodiment, said first steam turbine loop fluid 123e can comprise an exhaust liquid+vapor which then condensates into said condenser assembly 128. In one embodiment, said condenser assembly 128 can receive said first steam turbine loop fluid 123e through said first steam turbine loop conduit 180e and said fourth working fluid 123n through said fourth working conduit 180n. In one embodiment, said condenser assembly 128 can comprise said fifth working fluid 123p through said fifth working conduit 180p and said sixth working fluid 123q through said sixth working conduit 180q. In one embodiment, said fourth working fluid 123n and said first steam turbine loop fluid 123e do not comingle; rather, said fourth working fluid 123n is used to cool and condense said first steam turbine loop fluid 123e.

In one embodiment, said sixth working fluid 123q can exit said dual closed loop electric generating system 101 at said water output 108 (illustrated) or may be reused at said water input 104 (not illustrated). In one embodiment, said water output 108 can be used for commercial or municipal purposes. In one embodiment, said sixth working fluid 123q can be referred to as "off-take" fluids. In one embodiment, said sixth working fluid 123q can comprise a substantially pure water fluid which may need to be blended down for human uses, as is known in the art.

In one embodiment, said steam turbine assembly 140 can drive a shaft 430 which, in turn, drives said second generator 142 generating said second portion 106b of said electric output 106.

Figure 4D:
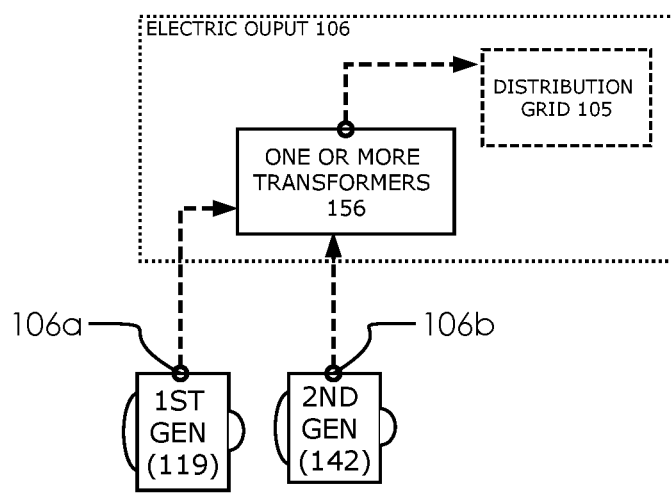

FIG. 4D illustrates a detailed view of said electric output 106. In one embodiment, said electric output 106 can further comprise said one or more transformers 156 to collect and transform said first portion 106a and said second portion 106b of said electric output 106, which is transmitted onto said distribution grid 105. In one embodiment, a grid operator or system designer can determine a proper number of said one or more transformers 156 to use according to preference, safety and budget, as is known in the art. For example, in one embodiment, it is known that in ring-bus systems a redundant transformer is often used.

Figure 5A:
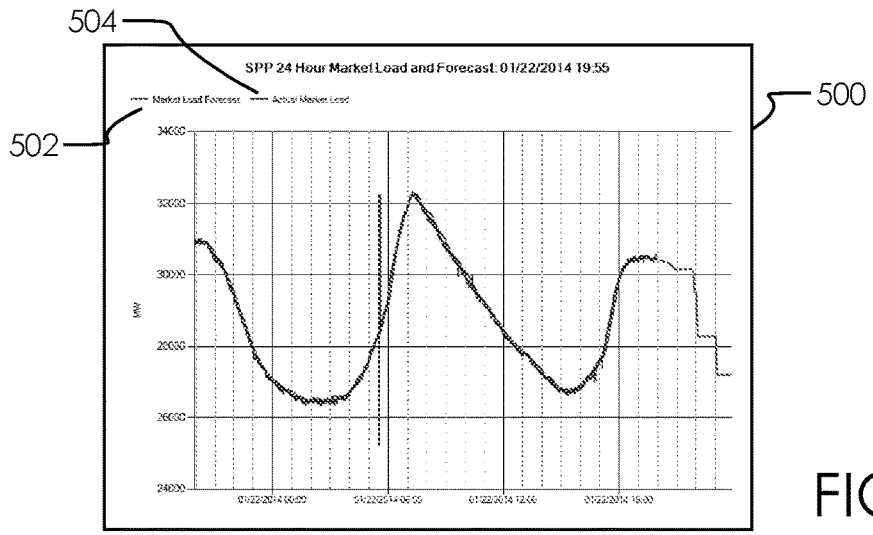
FIGS. 5A, 5B and 5C illustrate market load chart.
Figure 5B:
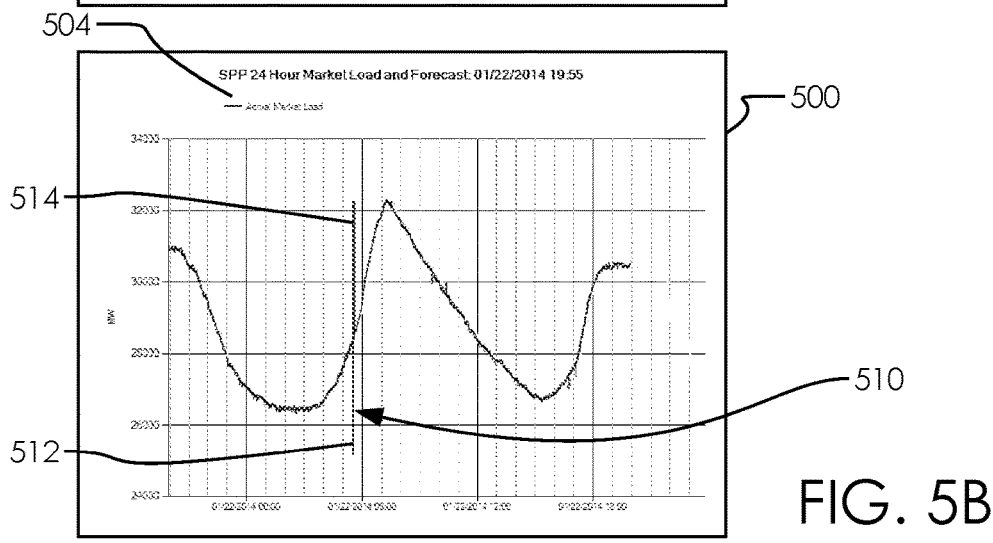
Figure 5C:
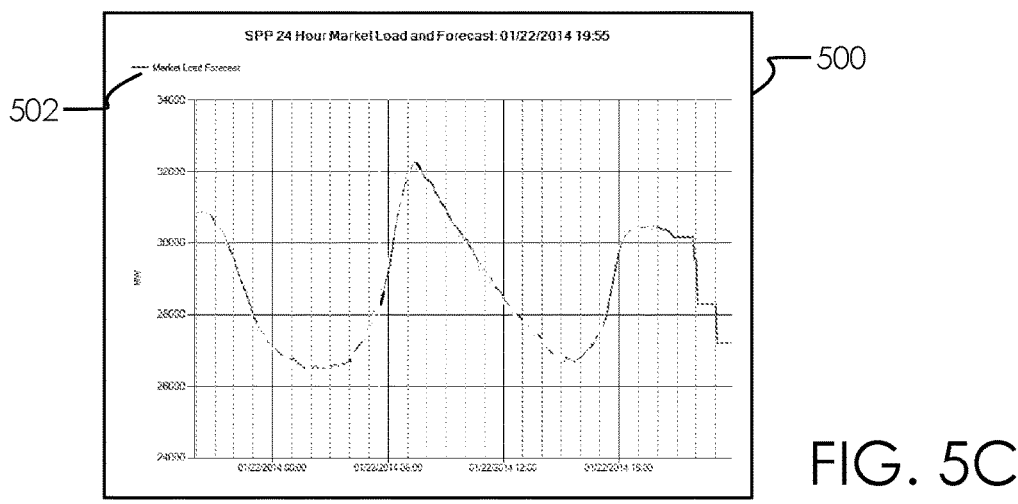

FIGS. 5A, 5B and 5C illustrate market load chart 500.

FIG. 5A illustrates said market load chart 500 with a market load forecast 502 and an actual market load 504. FIG. 5B illustrates said market load chart 500 with only said actual market load 504. FIG. 5C illustrates said market load chart 500 with said market load forecast 502. Said market load chart 500 represents a publicly available chart from the Southwest Power Pool (spp.org) and is data from the grid operator.

As is known in the art, said actual market load 504 does not always match said market load forecast 502. Accordingly, although grid operators spend much effort predicting said actual market load 504 they are not exactly right. The delta between said market load forecast 502 and said actual market load 504 represents a meaningful problem for grid operators. In one embodiment, said dual closed loop electric generating system 101 can help to overcome unexpected spikes and drops in said actual market load 504 as said dual closed loop electric generating system 101 is capable of cheaply ramping up to meet unexpected demand. Conversely, where said dual closed loop electric generating system 101 is used to provide a portion of the base load for said market load forecast 502, said dual closed loop electric generating system 101 can be used to absorb over production of power by purchasing such over production and converting the same into said H2 114 and said O2 116.

Said market load chart 500 also illustrates a system event 510 comprising an unexpected load drop 512 and a rebalancing compensation 514. In one embodiment, said system event 510 can comprise an event on said actual market load 504 which differs substantially from what was anticipated by said market load forecast 502. Here, said unexpected load drop 512 may have been caused by equipment failure or many other unexpected circumstances. In this case, the system over compensated at said rebalancing compensation 514 and eventually leveled back out at and around said market load forecast 502.

Said simplified block generating system diagram 100 includes several novel features that accord a number of advantages to the generation of electric power from renewable sources of energy in a two-closed loop water/steam system based on a gas turbine and steam turbine combination operating in a combined Brayton/Rankine cycle.

First, said gas turbine assembly 118 is fired by pure hydrogen (H2) and pure oxygen (O2) that is fed to said combustion chamber 408 of said gas turbine assembly 118 to produce supercritical steam. Thus, (a) said combustion pressure and temperature is much higher than would be the case if air (which is only 20% oxygen) is used as in conventional power plants. This mixture produces the supercritical steam exhausting said combustion chamber at high pressure, thus having a higher energy content for driving said gas turbine assembly 118 and generator combination. The supercritical steam produced using pure hydrogen and oxygen is also much less prone to causing corrosion than other materials; (b) in addition, mixing steam fed into said combustion chamber from the compressor with said said H2 114 and said O2 116 being burned in said combustion chamber adds mass to keep the steam in said combustion chamber within the thermal limits of the materials used in said gas turbine assembly 118 that drives the generator; further, (c) since the only combustion product is steam no harmful air pollutants or corrosive substances are produced as would the case be with using atmospheric air agent that must be heated along with the oxygen constituent of air, which would otherwise represent a substantial loss of heat to the system.

Second, efficiencies are found in the reuse of heat at said heat exchanger 111 (FIG. 1) and/or said first heat exchanger 111a (FIG. 3A-3B).

Third, combining said gas turbine assembly 118 and said steam turbine assembly 140 in two closed loops (a) protects said gas turbine assembly 118 from damage due to foreign objects that are prone to being drawn into the system in an open-loop, air-fed system, thus reducing down time due to repairs and maintenance. Further, (b) closed loop operation means that said dual closed loop electric generating system 101 operates under standard ISO conditions 100% of the time, that is, 15 Centigrade, 60% relative humidity, and sea level atmospheric pressure of 29.72 in. Hg. Moreover, (c) the lack of emissions of carbon compounds (where applicable) into the atmosphere eliminates air pollution by these substances.

In operation, the closed loop, cascaded architecture of said dual closed loop electric generating system 101, which uses pure hydrogen and oxygen as fuel and geothermal or ground water as feed water or an initial heat source, provides the opportunity for increased efficiency and substantially reduced losses, as well as a substantial reduction in harmful emissions into the atmosphere.

In one embodiment, said dual closed loop electric generating system 101 can be useful for providing VARs as required by said distribution grid 105. In electric power transmission and distribution, volt-ampere reactive ("VAR") is a unit used to measure reactive power in an AC electric power system. Reactive power exists in an AC circuit when the current and voltage are not in phase. In one embodiment, reactive power is produced by inductance as per Henry's law and not imbalances. The imbalances cause loss of voltage control. In one embodiment, a plurality of said dual closed loop electric generating system 101 can be distributed on said distribution grid 105 to provide corrective VARs to said distribution grid 105 as needed. In one embodiment, said dual closed loop electric generating system 101 can filter and balance VAR requirements on said distribution grid 105.

Figure 6:
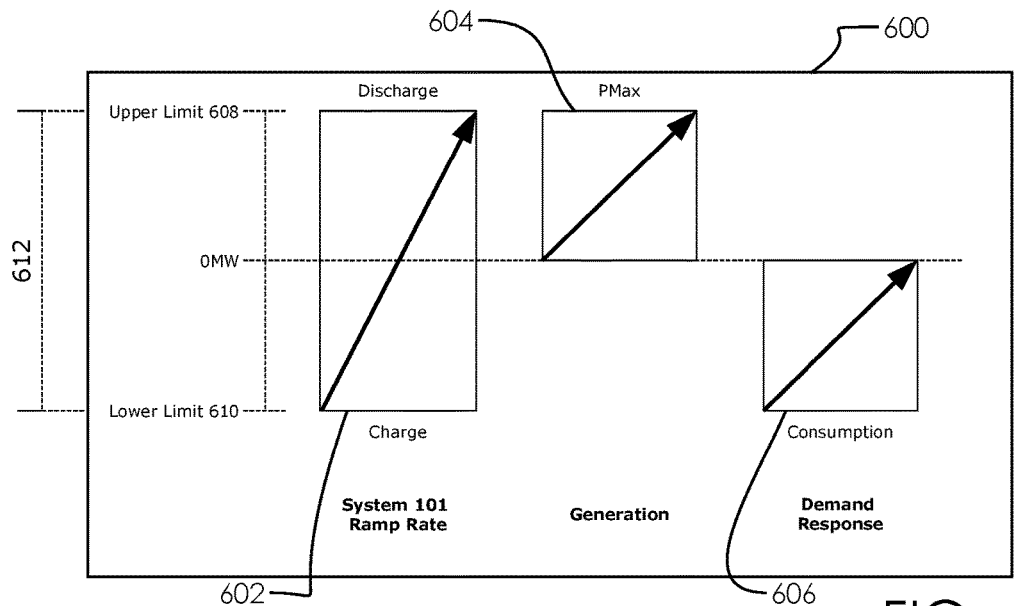
FIG. 6 illustrates a resource model chart.

FIG. 6 illustrates a resource model chart 600.

In one embodiment, said resource model chart 600 can illustrate a resource that can move seamlessly from load to generation. In one embodiment, said resource model chart 600 can comprise a system ramp rate column 602 (representing a ramp rate for said dual closed loop electric generating system 101), a generation column 604 and a demand response column 606. In one embodiment, said resource model chart 600 can illustrate a power consumption and generation principle between an upper limit 608 and a lower limit 610. In one embodiment, said dual closed loop electric generating system 101 can ramp up go meet needs of said distribution grid 105 quicker than alternative systems and store power when generation is beyond demand. This ability to quickly ramp up and store extra power serves to make said dual closed loop electric generating system 101 an invaluable tool for operators of said distribution grid 105.

Said resource model chart 600 has been based on a similar chart found in the California ISO presentation by Greg Cook at APEC Conference on Oct. 30, 2013 in New York, N.Y.

Said resource model chart 600 can comprise a maximum ramp 612 representing a sum of the absolute values of said upper limit 608 and said lower limit 610. In one embodiment, said maximum ramp 612 can comprise a distance which must be overcome by power systems, and said maximum ramp 612 is forecasted to increase based on future demands on power systems. Accordingly, said dual closed loop electric generating system 101 can help to accommodate power ramp rate needs.

Alternatively, in one embodiment, said dual closed loop electric generating system 101 can use said electrolyzer to provide system balancing capture spilled wind, filter harmonics and transients from large induction sources and resolve zero sequence issues. Indeed, said dual closed loop electric generating system 101 can react nearly instantaneously to balance loads on said distribution grid 105.

Figure 7:
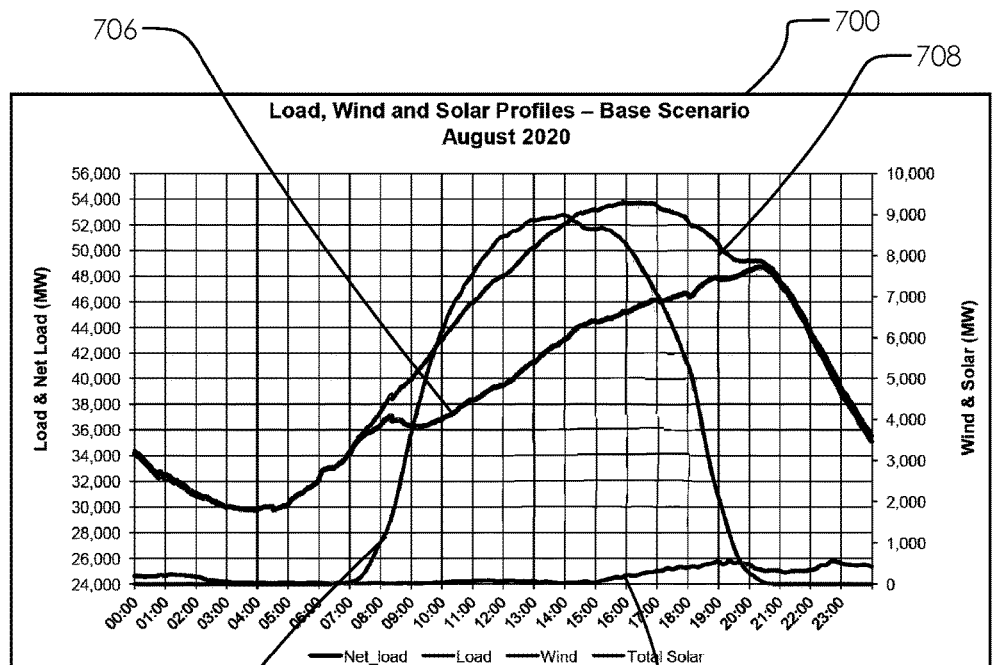
FIG. 7 illustrates a base load scenario chart.

FIG. 7 illustrates a base load scenario chart 700.

In one embodiment, said base load scenario chart 700 can illustrate a load over time for the year 2020 in California. In one embodiment, said base load scenario chart 700 can comprise values for a wind load 702, a total solar load 704, a net load 706 and a load 708. Said base load scenario chart 700 illustrates the variability of said wind load 702 and said total solar load 704 when forecasting power generation. Accordingly, the rapid ramp rate of said dual closed loop electric generating system 101 can be used to assist in this power management environment. Thus, in one embodiment said dual closed loop electric generating system 101 can use its reservoirs of said H2 114 and said O2 116 to help manage the demands of said distribution grid 105. Indeed, said dual closed loop electric generating system 101 can assist in dealing with sudden gusts of wind represented in said wind load 702, or a passing cloud represented in said total solar load 704 by storing power between times of production and times of consumption. Ultimately, this technology will assist in rolling out more of said wind or solar array 404 as managers now have a tool for using power which they generate.

Note that said base load scenario chart 700 has been take from a presentation by Mr. Mark Rothleder to the Innovating for Flexibility 2013 Summer Seminar of the California ISO of Aug. 5, 2013.

While the invention has been shown in only one of its forms, it is not thus limited but is susceptible to various changes and modifications without departing from the spirit thereof. In one alternative embodiment the boiler in the steam turbine input loop may be optional.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A combined cycle dual closed loop electric generating system, comprising:
a gas turbine assembly comprising a combustion chamber, a compressor, a first pump, a first driveshaft, a gas turbine, a first generator, a steam turbine assembly, a two closed loops and a first heat exchanger; wherein, said steam turbine assembly comprising a second pump, a second driveshaft, a steam turbine and a second generator;

said two closed loops comprising a gas turbine loop and a steam turbine loop;

said gas turbine loop is configured for holding and conveying a gas loop working fluids;

said steam turbine loop is configured for holding and conveying a steam loop working fluids;

said gas loop working fluid and said steam loop working fluids comprise a liquid and a vapor at different stages within said two closed loops;

said gas loop working fluids circulate through said gas turbine assembly and said first heat exchanger;

said steam loop working fluids circulate through said steam turbine assembly and said first heat exchanger;

said first heat exchanger transfers a first heat energy from said gas turbine loop to said steam turbine loop;

said gas turbine assembly generates a first portion of an electric output by
burning an $H_2$ and an $O_2$
running said gas turbine and
driving said first generator; and said steam turbine assembly generates a second portion of said electric output by
transferring said first heat energy to said steam turbine and
driving said second generator.

2. The combined cycle dual closed loop electric generating system of claim 1, wherein:
said gas turbine loop comprises
a first gas turbine loop conduit carrying a first gas turbine loop fluid from said gas turbine assembly to said first heat exchanger,
a second gas turbine loop conduit carrying a second gas turbine loop fluid from said first heat exchanger to a separator assembly,
a third gas turbine loop conduit carrying a third gas turbine loop fluid from said separator assembly to said gas turbine assembly, and
a fourth gas turbine loop conduit carrying a fourth gas turbine loop fluid from said separator assembly to said gas turbine assembly;
said first gas turbine loop fluid comprising an exhaust from said gas turbine assembly;
said third gas turbine loop fluid comprises a vapor;
said fourth gas turbine loop fluid comprises a liquid;
said fourth gas turbine loop conduit comprises said first pump configured for regulating a flow rate of said fourth gas turbine loop fluid through said fourth gas turbine loop conduit; and
said separator assembly is configured for separating said second gas turbine loop fluid into
a vapor portion comprising said third gas turbine loop fluid and
a liquid portion comprising said fourth gas turbine loop fluid.

3. The combined cycle dual closed loop electric generating system of claim 2, wherein:
said separator assembly comprises a second heat exchanger and a separator;
said second gas turbine loop conduit conveys said second gas turbine loop fluid from said first heat exchanger to said second heat exchanger;

a first working conduit conveys a first working fluid from a water input to said second heat exchanger;
said first working fluid enters said second heat exchanger and exits said second heat exchanger as a third working fluid in a third working conduit;
said second gas turbine loop fluid enters said second heat exchanger and exits said second heat exchanger as a fifth gas turbine loop fluid in a fifth gas turbine loop conduit;
said second heat exchanger cools said second gas turbine loop fluid by transferring a second heat energy from said second gas turbine loop fluid into said first working fluid;
said fifth gas turbine loop conduit conveys said fifth gas turbine loop fluid to said separator; and
said separator divides said fifth gas turbine loop fluid into said third gas turbine loop fluid and said fourth gas turbine loop fluid.

4. The combined cycle dual closed loop electric generating system of claim 3, wherein:
said third working conduit conveys said third working fluid from said second heat exchanger to an injection well.

5. The combined cycle dual closed loop electric generating system of claim 3, wherein:
said separator expels a second working fluid, comprising an exhaust liquid; and
a second working conduit conveys said second working fluid from said separator to a water output.

6. The combined cycle dual closed loop electric generating system of claim 3,
wherein, said first working fluid comprises water.

7. The combined cycle dual closed loop electric generating system of claim 2, wherein:
said separator assembly comprises a separator; said third gas turbine loop conduit conveys said third gas turbine loop fluid from said separator to said compressor of said gas turbine assembly;
said fourth gas turbine loop conduit conveys said fourth gas turbine loop fluid from said separator to said combustion chamber of said gas turbine assembly;
a seventeenth conduit conveys said $H_2$ to said combustion chamber;
a nineteenth conduit conveys said $O_2$ to said combustion chamber;
a twentieth conduit conveys a twentieth working fluid from said compressor to said combustion chamber;
a twenty-first gas turbine loop conduit conveys a twenty-first gas turbine loop fluid from said combustion chamber to said gas turbine;
said twenty-first gas turbine loop fluid comprises a fuel for said gas turbine;
said first gas turbine loop fluid is expelled out of said gas turbine assembly through said first gas turbine loop conduit;
said gas turbine drives said first driveshaft;
said first driveshaft drives said first generator; and
said first generator generates said first portion of said electric output.

8. The combined cycle dual closed loop electric generating system of claim 1, wherein:
said steam turbine loop comprises
a first steam turbine loop conduit conveying a first steam turbine loop fluid from said steam turbine assembly to said first heat exchanger, and a second steam turbine loop conduit conveying a second steam turbine loop fluid from said first heat exchanger to said steam turbine assembly;

said first steam turbine loop fluid comprising an exhaust from said steam turbine assembly;

said first heat exchanger is configured for heating said second steam turbine loop fluid prior to being conveyed back to said steam turbine assembly; and said second pump is placed on said first steam turbine loop conduit and is configured for regulating a flow rate of said first steam turbine loop fluid from said steam turbine assembly to said first heat exchanger.

9. The combined cycle dual closed loop electric generating system of claim 8, wherein:

said steam turbine loop further comprises a condenser assembly between said steam turbine assembly and said second pump;

said first steam turbine loop conduit conveys said first steam turbine loop fluid from said steam turbine assembly to said condenser assembly;

a fifth working conduit conveys a fifth working fluid from said condenser assembly to said first heat exchanger;

a fourth working conduit conveys a fourth working fluid from a water input to said condenser assembly;

a sixth working conduit conveys a sixth working fluid from said condenser assembly to a water output;

said first steam turbine loop fluid does not comingle with said fourth working fluid;

said first steam turbine loop fluid cools and condenses in said condenser assembly and exits as said fifth working fluid; and said fourth working fluid leaves said condenser assembly as said sixth working fluid.

10. The combined cycle dual closed loop electric generating system of claim 9, wherein:

said sixth working fluid is configured for use for potable water after dilution.

11. The combined cycle dual closed loop electric generating system of claim 8, further comprising a boiler;

said boiler is configured for heating a portion of said steam turbine loop by burning a portion of a natural gas input;

said second steam turbine loop conduit conveys said second steam turbine loop fluid from said first heat exchanger to said boiler; and a seventh working conduit conveys a seventh working fluid from said boiler to said steam turbine assembly.

12. The combined cycle dual closed loop electric generating system of claim 1, further comprising an electrolyzer; and wherein, said electrolyzer generates said $H_2$ and said $O_2$.

13. The combined cycle dual closed loop electric generating system of claim 12, wherein:

an eighth working conduit conveys an eighth working fluid from a water input to said electrolyzer; and said electrolyzer combines an electric input and said eighth working fluid to produce said $H_2$ and said $O_2$.

14. The combined cycle dual closed loop electric generating system of claim 13, wherein:

said eighth working fluid comprises a water treated by a water treatment system.

15. The combined cycle dual closed loop electric generating system of claim 12, wherein:

said $H_2$ and said $O_2$ generated by said electrolyzer are stored in an $H_2$ storage tank and an $O_2$ storage tank, respectively, prior to use by said gas turbine assembly.

16. The combined cycle dual closed loop electric generating system of claim 1, wherein:

said gas loop working fluids comprise a first gas turbine loop fluid, a second gas turbine loop fluid, a third gas turbine loop fluid and a fourth gas turbine loop fluid;

said steam loop working fluids comprise a first steam turbine loop fluid, a second steam turbine loop fluid, a fifth working fluid, and a seventh working fluid;

said first gas turbine loop fluid flows from said gas turbine assembly to said first heat exchanger;

said second gas turbine loop fluid flows from said first heat exchanger to a second heat exchanger, a fifth gas turbine loop fluid flows from said second heat exchanger to a separator;

said fourth gas turbine loop fluid and said third gas turbine loop fluid are conveyed from said separator to said gas turbine assembly;

said first steam turbine loop fluid flows from said steam turbine assembly to a condenser assembly, said fifth working fluid flows from said condenser assembly to said first heat exchanger, said second steam turbine loop fluid flows from said first heat exchanger to a boiler; and said seventh working fluid flows from said boiler to said steam turbine assembly.

17. The combined cycle dual closed loop electric generating system of claim 1, wherein:

said steam turbine assembly and said gas turbine assembly are configured for generating Volt-ampere reactive characteristics in said electric output.

18. A method of using a combined cycle dual closed loop electric generating system, comprising:

generating a first portion of an electric output with a gas turbine assembly by burning a portion of an $H_2$ and an $O_2$;

circulating a first portion of a working fluid through a gas turbine loop and a second portion of said working fluid through a steam turbine loop;

heating said steam turbine loop with a first heat energy from said gas turbine loop with a first heat exchanger;

conveying said second portion of said working fluid into a steam turbine assembly; and generating a second portion of said electric output with said steam turbine assembly; wherein, said gas turbine assembly comprises a combustion chamber, a compressor, a first pump, a first driveshaft, a gas turbine and a first generator;

said steam turbine assembly comprising a second pump, a second driveshaft, a steam turbine and a second generator;

said gas turbine loop is configured for holding and conveying the first portion of the working fluid;

said steam turbine loop is configured for holding and conveying the second portion of said working fluid;

a two closed loops comprising said gas turbine loop and said steam turbine loop;

said working fluid comprising a liquid and a vapor at different stages within said two closed loops;

said first portion of said working fluid circulates through said gas turbine assembly and the first heat exchanger;

said second portion of said working fluid circulates through said steam turbine assembly and said first heat exchanger; and said first heat exchanger transfers said first heat energy from said gas turbine loop to said steam turbine loop.

19. The method of claim 18, comprising:
receiving an electric input and a water input at an electrolyzer;
electrolyzing said water input with said electrolyzer;
generating said $H_2$ and said $O_2$ with said electrolyzer; and
storing said $H_2$ and said $O_2$ in an $H_2$ storage tank and $O_2$ storage tank, respectively.

20. The method of claim 18, comprising:
balancing a load on a distribution grid by generating said electric output as required from stored portions of said $H_2$ and said $O_2$.

* * * * *